(12) United States Patent
Sakakibara et al.

(10) Patent No.: US 11,179,833 B2
(45) Date of Patent: Nov. 23, 2021

(54) TIGHTENING DEVICE

(71) Applicant: HONDA MOTOR CO., LTD., Tokyo (JP)

(72) Inventors: Toshitsugu Sakakibara, Wako (JP); Kazuhiro Tsuzaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 315 days.

(21) Appl. No.: 16/527,893

(22) Filed: Jul. 31, 2019

(65) Prior Publication Data

US 2020/0039038 A1 Feb. 6, 2020

(30) Foreign Application Priority Data

Aug. 3, 2018 (JP) .............................. JP2018-146820

(51) Int. Cl.
*B25B 23/142* (2006.01)
*G01C 3/06* (2006.01)
*G01L 3/14* (2006.01)

(52) U.S. Cl.
CPC ............ *B25B 23/1425* (2013.01); *G01C 3/06* (2013.01); *G01L 3/1464* (2013.01)

(58) Field of Classification Search
CPC ...... B25B 23/1425; G01C 3/06; G01L 3/1464
See application file for complete search history.

(56) References Cited

U.S. PATENT DOCUMENTS

| | | | |
|---|---|---|---|
| 4,569,229 A * | 2/1986 | de Halleux | G01L 5/246 411/14 |
| 4,686,859 A | 8/1987 | Wallace | |
| 5,029,480 A | 7/1991 | Kibblewhite | |
| 5,131,276 A | 7/1992 | Kibblewhite | |
| 5,205,176 A | 4/1993 | Kibblewhite | |
| 5,220,839 A | 6/1993 | Kibblewhite | |
| 5,476,014 A * | 12/1995 | Lampe | B25B 23/14 73/862.21 |
| 6,009,759 A * | 1/2000 | Kibblewhite | G01L 5/246 73/761 |
| 6,186,010 B1 * | 2/2001 | Eguchi | G01L 5/246 73/597 |
| 6,234,051 B1 * | 5/2001 | Bareggi | B25B 23/0035 73/862.21 |
| 2005/0193869 A1 | 9/2005 | Ohtake et al. | |

(Continued)

FOREIGN PATENT DOCUMENTS

| | | |
|---|---|---|
| CN | 1060526 A | 4/1992 |
| CN | 101354299 A | 1/2009 |

(Continued)

OTHER PUBLICATIONS

Office Action received in corresponding CN application No. 201910716358.7 dated Dec. 29, 2020 with English translation (13 pages).

(Continued)

*Primary Examiner* — Max H Noori
(74) *Attorney, Agent, or Firm* — Rankin, Hill & Clark LLP (57) ABSTRACT

A tightening device includes: a sensor for detecting an elongation of a bolt; a socket for rotating the bolt; and a biasing member for biasing the sensor against a head of the bolt. The sensor and the socket are provided separately and independently of each other.

8 Claims, 9 Drawing Sheets (56) References Cited

U.S. PATENT DOCUMENTS

| | | | | |
|---|---|---|---|---|
| 2006/0137463 | A1* | 6/2006 | Nassar | G01L 5/246 |
| | | | | 73/761 |
| 2008/0131228 | A1* | 6/2008 | Sheets | B25B 23/1425 |
| | | | | 411/14 |
| 2014/0190267 | A1* | 7/2014 | Mekid | G01L 5/0038 |
| | | | | 73/761 |
| 2017/0023425 | A1 | 1/2017 | Kibblewhite | |
| 2020/0040929 | A1* | 2/2020 | Tsuzaki | F16B 31/02 |
| 2020/0238454 | A1* | 7/2020 | Hohmann | B23P 19/067 |

FOREIGN PATENT DOCUMENTS

| | | |
|---|---|---|
| CN | 102288352 A | 12/2011 |
| CN | 205175603 U | 4/2016 |
| CN | 206038209 U | 3/2017 |
| CN | 107576439 A | 1/2018 |
| DE | 69112856 T2 | 2/1996 |
| EP | 0467262 A1 | 1/1992 |
| JP | S60-127862 U | 8/1985 |
| JP | H02-79436 U | 6/1990 |
| JP | 2003-326425 A | 11/2003 |
| JP | 2005-279920 A | 10/2005 |
| JP | 2007-301663 A | 11/2007 |

OTHER PUBLICATIONS

Office Action received in corresponding Japanese application No. 2018-146820 dated Aug. 4, 2020 with English translation (6 pages).
Japanese Office Action received in corresponding JP application No. 2018-146820 dated Feb. 18, 2020 with English translation (8 pages).
Office Action received in corresponding German application No. 102019211520.9 dated Mar. 24, 2020 with English translation (24 pages).

* cited by examiner

TIGHTENING DEVICE

CROSS-REFERENCE TO RELATED APPLICATIONS

The present application claims priority under 35 U.S.C. § 119 to Japanese Patent Application No. 2018-146820, filed Aug. 3, 2018, the contents of which are hereby incorporated by reference in their entirety.

BACKGROUND OF THE INVENTION

1. Field of the Invention

The present invention relates to a tightening device for fasteners.

2. Description of the Related Art

Some conventionally known tightening devices include: a socket for tightening a nut on a bolt; and an ultrasonic sensor used to detect axial force of the bolt, wherein the socket and ultrasonic sensor are integrally provided (see Japanese Patent Laid-open Publication No. 2005-279920, for example). The tightening device detects, while tightening the nut on the bolt with the socket, an elongation of the bolt with a B echo (bottom echo of the bolt shank) of an ultrasonic pulse emitted from the ultrasonic sensor which has been brought into abutment with one end of the bolt.

According to such a structure of the tightening device, it is possible to measure axial force of a bolt while tightening a nut on a bolt.

With such a tightening device (see Japanese Patent Laid-open Publication No. 2005-279920, for example), if the end surface of the bolt and the ultrasonic sensor are not in close contact, ultrasonic pulses are not properly emitted into the bolt, and the tightening device cannot properly receive the B echo thereof. This tightening device therefore further includes a biasing member that presses the ultrasonic sensor against the end surface of the bolt.

According to the structure of this tightening device, the socket and ultrasonic sensor are integrally provided. This causes a problem that wobbling and vibration of the socket during tightening of the nut can be transmitted to the ultrasonic sensor. That is, according to the structure of the conventional tightening devices, the ultrasonic sensor inclines with respect to or separates from the end surface of the bolt when tightening the nut in some cases. Such conventional tightening devices therefore have difficulties in measuring the axial force of the bolt with a high degree of accuracy while tightening the nut.

SUMMARY OF THE INVENTION

The present invention has been made to solve the above problems, and an object of the invention is to provide a tightening device capable of measuring the bolt axial force with a high degree of accuracy while tightening the bolt.

An aspect of the present invention is a tightening device including: a sensor for detecting an elongation of a bolt; a socket for rotating the bolt; and a biasing member for biasing the sensor against a head of the bolt. The sensor and the socket are provided separately and independently of each other.

According to the present invention, it is possible to provide a tightening device capable of measuring the bolt axial force with high accuracy while tightening the bolt.

DETAILED DESCRIPTION OF THE EMBODIMENTS

A mode (embodiment) for carrying out the present invention will be hereinafter described in detail with reference to the accompanying drawings. Hereinafter, a bolt axial force measurement apparatus (and a bolt axial force measurement program) including a tightening device, a bolt axial force measurement method, and a bolt according to the embodiment will be described in detail.

Bolt Axial Force Measurement Apparatus

The bolt axial force measurement apparatus of the embodiment is configured to measure the axial force of a bolt while tightening the bolt. The bolt axial force measurement apparatus stops the tightening when the measured bolt axial force reaches a predetermined value.

Figure 1:
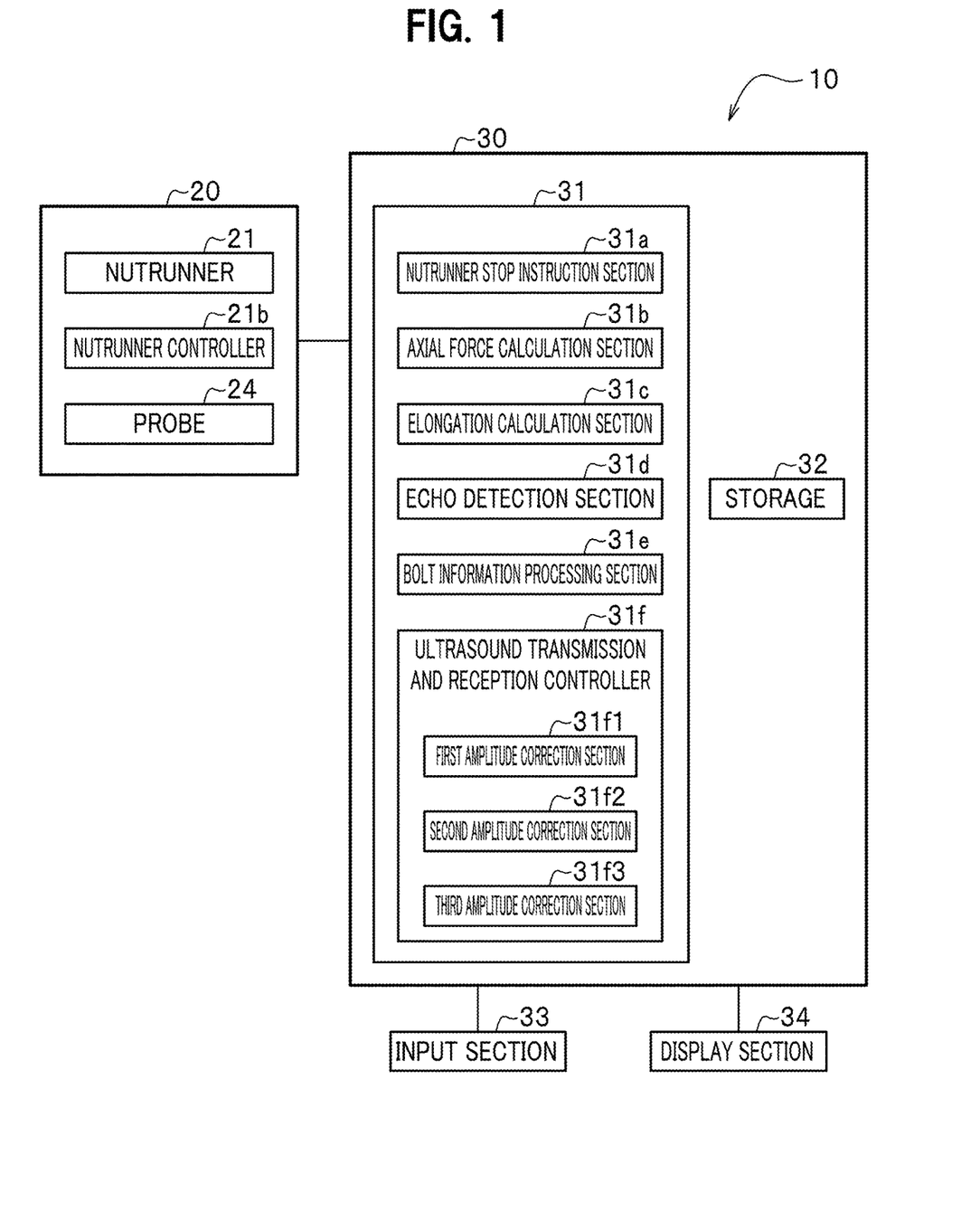
FIG. 1 is a block diagram of a bolt axial force measurement apparatus including a tightening device according to an embodiment of the present invention.

FIG. 1 is a block diagram of a bolt axial force measurement apparatus 10 according to the embodiment.

As illustrated in FIG. 1, the bolt axial force measurement apparatus 10 according to the embodiment mainly includes a tightening device 20 for tightening a bolt, a controller 30, an input section 33, and a display section 34.

Tightening Device

First, a description will be given of the tightening device 20.

Figure 2:
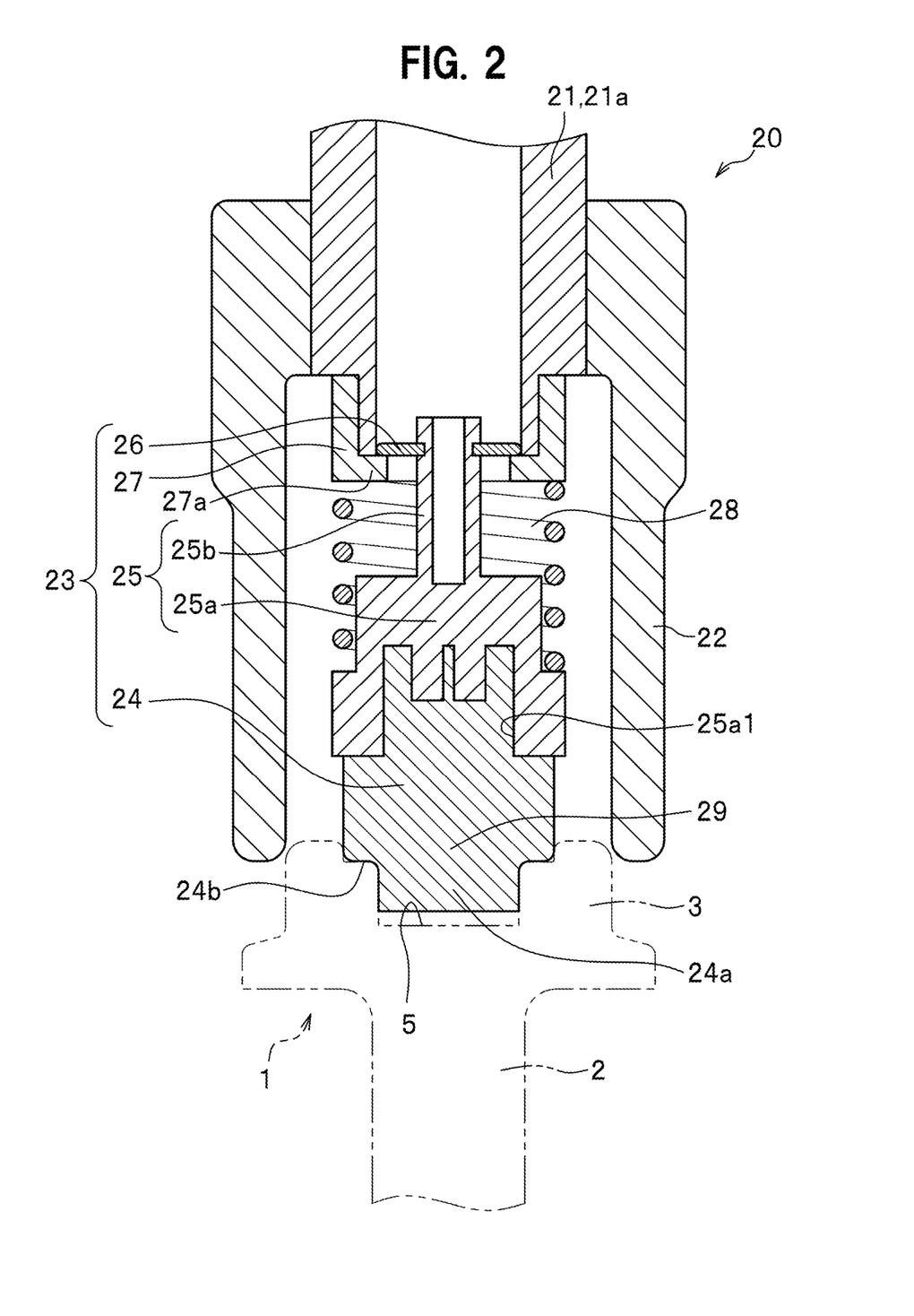
FIG. 2 is a partial enlarged cross-sectional view of the tightening device included in the bolt axial force measurement apparatus of FIG. 1.

FIG. 2 is an explanatory diagram for explaining the tightening device 20. In FIG. 2, a bolt 1 to be tightened by the tightening device 20 is indicated by an imaginary line (alternate long and two short dashed line).

As illustrated in FIG. 2, the tightening device 20 includes a nutrunner 21, a probe unit 23, a resilient coil spring 28 serving as a biasing member, and a socket 22. The tightening device 20 also includes a nutrunner controller 21b (see FIG. 1).

The nutrunner 21 has a rotary shaft 21a, which is driven with a predetermined torque and rotated at a predetermined rotational speed (rotational angular speed) according to an instruction from a nutrunner controller 21b (see FIG. 1) described later. The rotary shaft 21a has a tubular shape.

The nutrunner 21 is configured to drive and rotate the rotary shaft 21a according to an instruction outputted from the nutrunner controller 21b (see FIG. 1). The nutrunner 21 is configured to stop according to an instruction outputted from a nutrunner stop instruction section 31a (see FIG. 1) described later.

The probe unit 23 has a probe 24 (ultrasonic sensor), a probe support member 25, an attachment member 27 for the rotary shaft 21a, and a retaining member 26.

The probe 24 includes a piezoelectric element (not illustrated) that emits an ultrasonic pulse and receives echoes of the emitted ultrasonic pulse. Electric signals of the echoes received by the probe 24 are outputted to the controller 30 (see FIG. 1) described later.

The probe 24 is formed in a substantially circular columnar shape. The probe 24 has a bottom on which a centrally located, substantially circular columnar protrusion 24a protruding downward is formed. In other words, the probe 24 includes a lower end portion on which a stepped protrusion 29 with a step portion 24b is formed.

The probe 24 is interfitted with a recess 5 formed on a head 3 of the bolt 1, as described later.

The probe support member 25 includes: a base 25a; and a shaft 25b extending upward from a central portion of an upper surface of the base 25a.

The base 25a has a lower portion on which an engaging portion 25a1 is formed. The engaging portion 25a1 is detachably attached to an upper portion of the probe 24.

The shaft 25b can be advanced into and retracted from a hollow space of the rotary shaft 21a.

According to the present embodiment, the attachment member 27 has a substantially circular cylindrical shape.

The attachment member 27 is attached to an outer circumference of a lower portion of the rotary shaft 21a. The attachment member 27 is attached to the rotary shaft 21a by a publicly-known method, such as fitting. However, the attachment method thereof is not particularly limited. The attachment member 27 and the rotary shaft 21a may be integrally formed.

The attachment member 27 has a lower end from which a flange 27a extends inward in the radial direction. A retaining member 26, which is constituted by a washer fitted to a top portion of the shaft 25b, comes into abutment with an upper surface of the flange 27a.

The resilient coil spring 28 is provided so as to be wound around the probe support member 25. The resilient coil spring 28 has an upper end seated on a lower surface of the attachment member 27, and has a lower end seated on an outer circumferential step of the base 25a.

According to the structure of the probe support member 25, the shaft 25b is allowed to shift upward and downward in the hollow space of the rotary shaft 21a while the base 25a is brought upward against a biasing force of the resilient coil spring 28.

The retaining member 26 comes into abutment with the upper surface of the flange 27a to prevent the shaft 25b from falling out of the hollow space of the rotary shaft 21a.

The socket 22 has a substantially circular cylindrical shape. On an inner circumference of an upper portion of the socket 22, a lower portion of the rotary shaft 21a is detachably fitted. This restricts circumferential displacement of the socket 22 with respect to the rotary shaft 21a. According to the present embodiment, it is assumed that the rotary shaft 21a and the socket 22 are spline-fitted with each other. However, the structure of the joint between the rotary shaft 21a and socket 22 is not limited to such a configuration.

According to this structure of the tightening device 20, when the socket 22 is mated with the head 3 of the bolt 1, the resilient coil spring 28 applies a biasing force to the probe 24 interfitted with the recess 5 of the bolt 1 to thereby bias the probe 24 toward the head 3.

In addition, according to the structure of the tightening device 20, the socket 22 and probe unit 23 are separately and independently connected to the rotary shaft 21a.

The probe 24 is supported by the rotary shaft 21a in a semi-floating manner via the resilient coil spring 28 interposed between the probe 24 and rotary shaft 21a.

Next, a description will be given of the controller 30.

As illustrated in FIG. 1, the controller 30 mainly includes: an arithmetic processing unit 31 composed of a processor, such as a central processing unit (CPU); and a storage 32 composed of a read-only-memory (ROM) with programs stored thereon and a random-access-memory (RAM) temporarily storing data and the like.

The arithmetic processing unit 31 of the present embodiment includes the nutrunner stop instruction section 31a, an axial force calculation section 31b, an elongation calculation section 31c, an echo detection section 31d, a bolt information processing section 31e, and an ultrasound transmission and reception controller 31f.

The nutrunner stop instruction section 31a outputs to the nutrunner 21 an instruction to stop the application of an axial force to the bolt 1, when the measured axial force (F) of the bolt 1 reaches a target axial force as described later.

The axial force calculation section 31b calculates the axial force according to the later-described equation 1. The elongation calculation section 31c calculates the elongation of the bolt 1 due to the tightening of the bolt 1 (see FIG. 2). The echo detection section 31d calculates a zero-crossing point of an ultrasonic echo signal and the like. The bolt information processing section 31e outputs information about the bolt 1 to be measured, to the storage 32. The ultrasound transmission and reception controller 31f causes the probe 24 to emit an ultrasonic pulse and amplifies received ultrasonic echo signals.

Those constituent components of the arithmetic processing unit 31 will be described further in detail together with the description of the bolt axial force measurement method described later.

According to the present embodiment, the input section 33 is assumed to be a keyboard or the like through which the bolt information is inputted to the bolt information processing section 31e. However, the input section 33 may be a touch panel serving also as the display section 34. Through the input section 33, a request task to be processed by the arithmetic processing unit 31 can be inputted.

The display section 34 of the present embodiment is assumed to be a monitor, a speaker, or the like that visually or verbally presents information outputted from the arithmetic processing unit 31.

Bolt Axial Force Measurement Method

Next, a description will be given of a bolt axial force measurement method of the embodiment.

The bolt axial force measurement method includes: a process to input bolt information to the bolt axial force measurement apparatus 10 (bolt information input process);

a process to set the bolt 1 (see FIG. 2) to the bolt axial force measurement apparatus 10 (bolt setting process); and a bolt axial force measurement process.

Bolt Information Input Process

In the bolt information input process, information on the bolt 1 (see FIG. 2) to be measured is inputted to the controller 30 (see FIG. 1) via the input section 33.

The bolt information according to this embodiment includes Young's modulus (E), effective diameter (A), and tightening length (L) of the bolt 1, which are to be substituted in equation 1 to calculate the axial force (F).

$$F=(E \times A/L)\delta \qquad \text{equation 1}$$

As to the elongation ($\delta$) of the bolt 1 in equation 1, it is calculated by the elongation calculation section 31c as described below.

The aforementioned bolt information is stored in the storage 32 via the bolt information processing section 31e of the controller 30.

Bolt Setting Process

Next, a description will be given of the bolt setting process.

Figure 3:
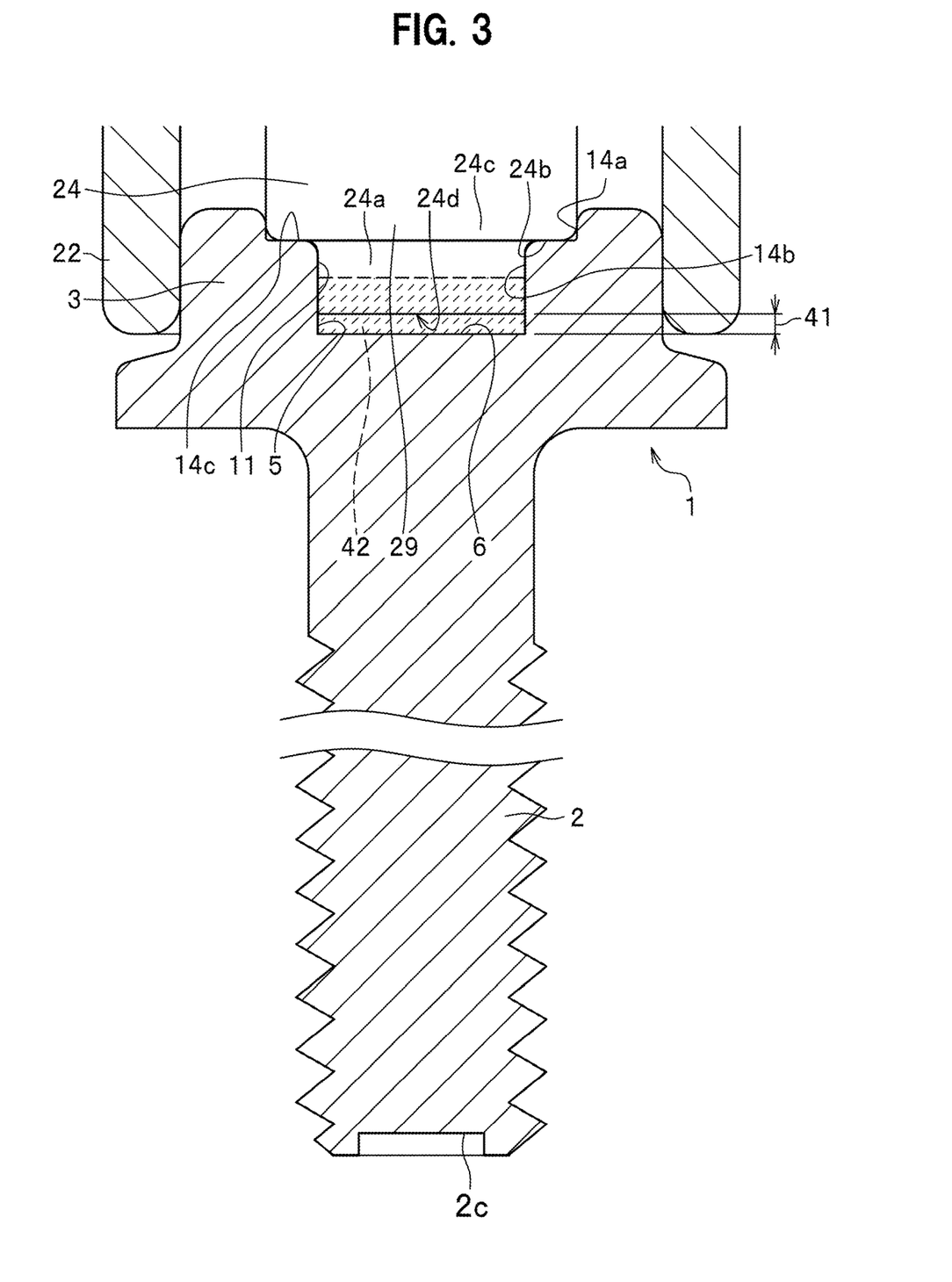
FIG. 3 is an explanatory diagram of a bolt setting process performed in a bolt axial force measurement method according to the embodiment of the present invention.

FIG. 3 is an explanatory view for explaining the bolt setting process of the bolt axial force measurement method.

As illustrated in FIG. 3, in the bolt setting process, a probe fitting process to fit the probe 24 to the recess 5 of the bolt 1 and a gap forming process to form a gap 41 between the bolt 1 and probe 24 are performed in parallel.

In the probe fitting process, the probe 24 is interfitted with a recess 5 (stepped recess) of the bolt 1.

Specifically, in the probe fitting process, an outer circumferential surface of a top body section 24c of the probe 24 is brought into contact with an inner circumferential surface of a large-diameter portion 14a of the recess 5.

The protrusion 24a of the probe 24 is housed within a small-diameter portion 14b of the recess 5.

In the gap forming process, the gap 41 is formed between a surface of the bolt 1 that is defined by a bottom surface 6 of the recess 5 and a surface of the probe 24 that is defined by a top surface 24d of the protrusion 24a.

Specifically, a step portion 14c of the bolt 1 and the step portion 24b of the probe 24 come into abutment with each other to form the gap 41. This gap 41 is formed by the bottom surface 6 of the recess 5 and the top surface 24d of the protrusion 24a facing each other in parallel.

The gap 41 is filled with an ultrasound propagation medium 42.

The ultrasound propagation medium 42 is not limited particularly. Examples of the ultrasound propagation medium 42 include publicly-known mediums such as machine oil, water, hydrous polymers, liquid paraffin, castor oil, gel materials, and elastomers. Among those, the gel materials and elastomers are preferred.

In FIG. 3, reference numeral 22 denotes the socket that is fitted on the head 3 of the bolt 1.

Bolt Axial Force Measurement Process

Next, a description will be given of the bolt axial force measurement process.

Figure 4:
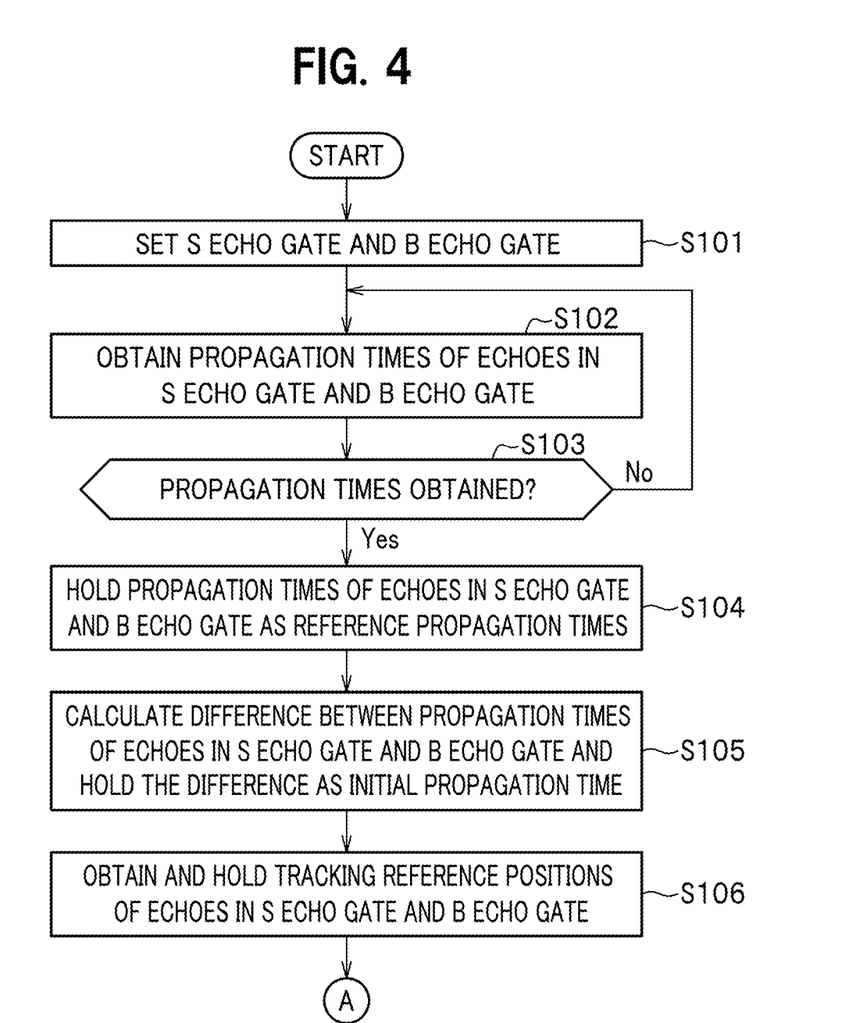
FIG. 4 is a flowchart of a bolt axial force measurement process performed in the bolt axial force measurement method according to the embodiment of the present invention.
Figure 5:
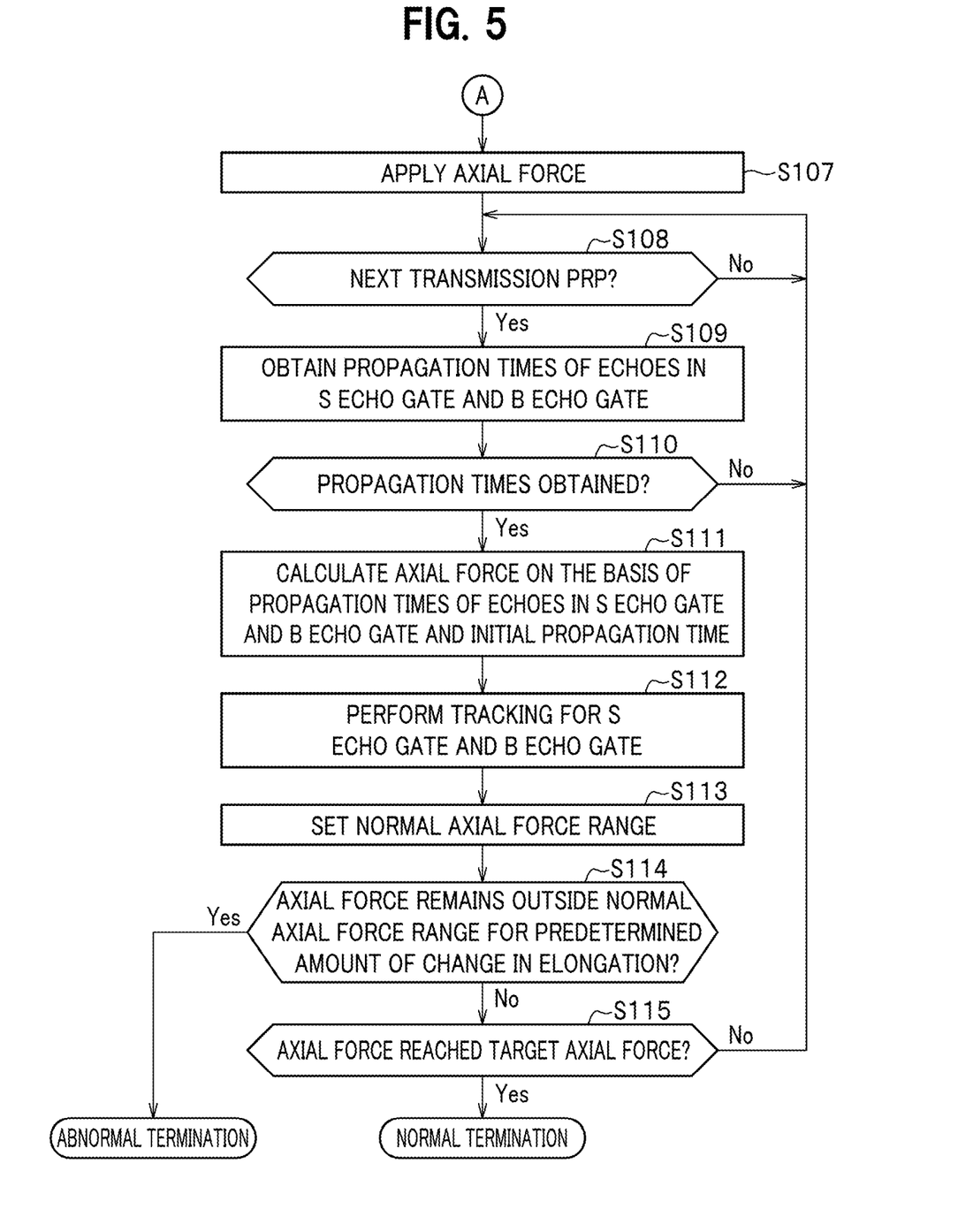
FIG. 5 is a flowchart of the bolt axial force measurement process performed in the bolt axial force measurement method according to the embodiment of the present invention.

FIGS. 4 and 5 show a flowchart of the bolt axial force measurement process.

In the bolt axial force measurement process, a head echo gate (S echo gate) and a bottom echo gate (B echo gate) are set for an ultrasonic pulse emitted from the probe 24 to the bolt 1 (see FIG. 3).

These settings are performed in advance on the basis of information about the gap 41 (see FIG. 3) obtained by the echo detection section 31d (see FIG. 1) by referencing the storage 32 as well as the length of the bolt 1. The ranges of propagation times that specify the head echo gate (S echo gate) and the bottom echo gate (B echo gate) are stored in the storage 32 by the echo detection section 31d.

These S and B echo gates are set to propagation time ranges wider than those of S and B echo gates for which the later-described auto-tracking is performed. The durations of the S and B echo gates herein can each be set to about two cycles of the ultrasonic pulse but are not limited thereto.

In the bolt axial force measurement process, next, the probe 24 emits an ultrasonic pulse to the bolt 1 (see FIG. 3). This emission of ultrasonic pulse is performed according to an instruction from the ultrasound transmission and reception controller 31f of the controller 30 (see FIG. 1). The time at which the ultrasonic pulse is emitted (emission time) is stored in the storage 32 (see FIG. 1) by the ultrasound transmission and reception controller 31f. In this embodiment, it is assumed that an ultrasonic pulse is emitted (to be specific, emitted during application of axial force) for each pulse repetition period. However, the present invention is not limited to such a configuration.

The ultrasonic pulse is reflected on a top surface of the bolt 1 that is defined by the bottom surface 6 of the recess 5 and is also reflected on a bottom surface 2c defined at a distal end portion of a shank 2 of the bolt 1 (see FIG. 3).

The probe 24 receives a 0th head echo (S0 echo) reflected on the top surface of the bolt 1 (see FIG. 3) and receives a 0th bottom echo (B0 echo) reflected on the bottom surface 2c of the bolt 1. Herein, the "0th" means a measurement before application of axial force.

The ultrasound transmission and reception controller 31f (see FIG. 1) amplifies the signals of the S0 and B0 echoes received by the probe 24 separately and independently, for example.

The echo detection section 31d gets the amplified S0 and B0 echo signals from the ultrasound transmission and reception controller 31f and gets the propagation time ranges of the S and B echo gates by referencing the storage 32.

Subsequently, the echo detection section 31d sets (step S101) an S echo gate $G_{S0}$ and a B echo gate $G_{B0}$ based on the S0 and B0 echoes.

Figure 6:
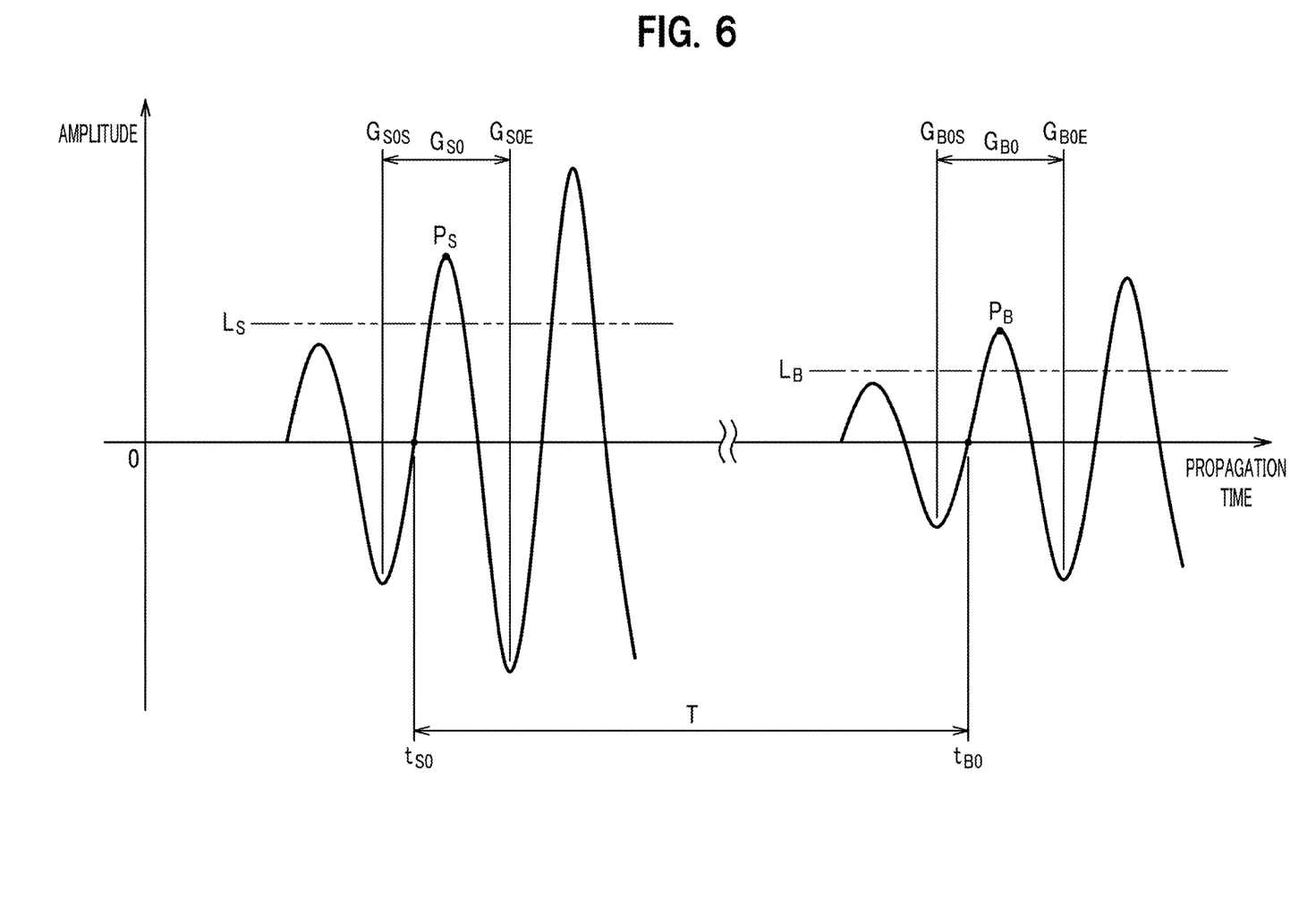
FIG. 6 is a schematic waveform diagram illustrating a head echo and a bottom echo processed in the bolt axial force measurement method according to the embodiment of the present invention.

To be specific, analyzing the S0 echo signal in the propagation time range, the echo detection section 31d sets a starting point $G_{S0S}$ of the S echo gate $G_{S0}$ to a half wave-cycle before a position $P_S$ of a peak of the S0 echo signal that has first arrived after the amplitude of the signal has exceeded a predetermined positive or negative level $L_S$ (see FIG. 6). The echo detection section 31d sets an ending point $G_{S0E}$ of the S echo gate $G_{S0}$ to a one wave-cycle after the starting point $G_{S0S}$ (see FIG. 6).

In this embodiment, the level $L_S$ is set to a positive value. In this case, the amplitude exceeding the level $L_S$ means that the signal level of the pulse wave changes from a value lower than the level $L_S$ to a value greater than the level $L_S$ in a graph with a horizontal axis representing propagation time. The peak position $P_S$ in this case is of a positive peak. In contrast, when the level $L_S$ is set to a negative value, the amplitude exceeding the level $L_S$ means that the signal level of the pulse wave changes from a value greater than the level $L_S$ to a value lower than the level $L_S$ in a graph with propagation time represented on the horizontal axis. The peak position PS in this case is of a negative peak.

In a similar manner, analyzing the B0 echo signal within the propagation time range, the echo detection section 31d sets a starting point $G_{B0S}$ of the B echo gate $G_{B0}$ to a half wave-cycle before a position $P_B$ of a peak of the B0 echo signal that has first arrived after the amplitude of the signal has exceeded a predetermined positive or negative level $L_B$ (see FIG. 6). The echo detection section 31$d$ sets an ending point $G_{B0E}$ of the B echo gate $G_{B0}$ to a one wave-cycle after the starting point $G_{B0S}$ (see FIG. 6).

In this embodiment, the level $L_B$ is set to a positive value. In this case, the amplitude exceeding the level $L_B$ means that the signal level of the pulse wave changes from a value lower than the level $L_B$ to a value greater than the level $L_B$ in a graph with a horizontal axis representing propagation time. The peak position $P_B$ in this case is of a positive peak. In contrast, when the level $L_B$ is set to a negative value, the amplitude exceeding the level $L_B$ means that the signal level of the pulse wave changes from a value greater than the level $L_B$ to a value lower than the level $L_B$ in a graph with propagation time represented on the horizontal axis. The peak position PB in this case is of a negative peak.

Subsequently, the echo detection section 31$d$ obtains (step S102) the propagation time of the S0 echo within the S echo gate $G_{S0}$ and the propagation time of the B0 echo within the B echo gate $G_{B0}$.

To be specific, the echo detection section 31$d$ detects a zero-crossing point of the S0 echo signal just before the positive or negative peak of the S0 echo signal within the S echo gate $G_{S0}$ and obtains the propagation time $t_{S0}$ at the detected zero-crossing point as the propagation time of the S0 echo (see FIG. 6). In this embodiment, the zero-crossing point is a point where the amplitude of the signal of the echo of the ultrasonic pulse is zero.

In a similar manner, the echo detection section 31$d$ detects a zero-crossing point of the B0 echo signal just before the positive or negative peak of the B0 echo signal within the B echo gate $G_{B0}$ and obtains propagation time $t_{B0}$ at the detected zero-crossing point as the propagation time of the B0 echo (see FIG. 6).

The echo detection section 31$d$ repeats step S102 until the echo detection section 31$d$ finishes obtaining the propagation times of the S0 echo and B0 echo (No in step S103).

Subsequently, when finishing obtaining the propagation times of the S0 echo and B0 echo (Yes in step S103), the echo detection section 31$d$ obtains and holds (step S104) the starting point $G_{S0S}$ as a tracking reference position of the S echo gate $G_{S0}$ (see FIG. 6).

In a similar manner, the echo detection section 31$d$ obtains and holds (step S104) the starting point $G_{B0S}$ (see FIG. 6) as a tracking reference position of the B echo gate $G_{B0}$.

Next, in the bolt axial force measurement process, the nutrunner controller 21$b$ outputs an activation instruction to the nutrunner 21 (see FIG. 1).

Axial force is then applied (step S107) to the bolt 1 by the tightening device 20 (see FIG. 1).

Upon receipt of an echo of the ultrasonic pulse in the next (n-th; n is a natural number) pulse repetition period (PRP) (Yes in step S108), the echo detection section 31$d$ obtains the propagation time of the Sn echo within the S echo gate $G_{Sn-1}$ and the propagation time of the Bn echo within the B echo gate $G_{Bn-1}$ (step S109).

Figure 7:
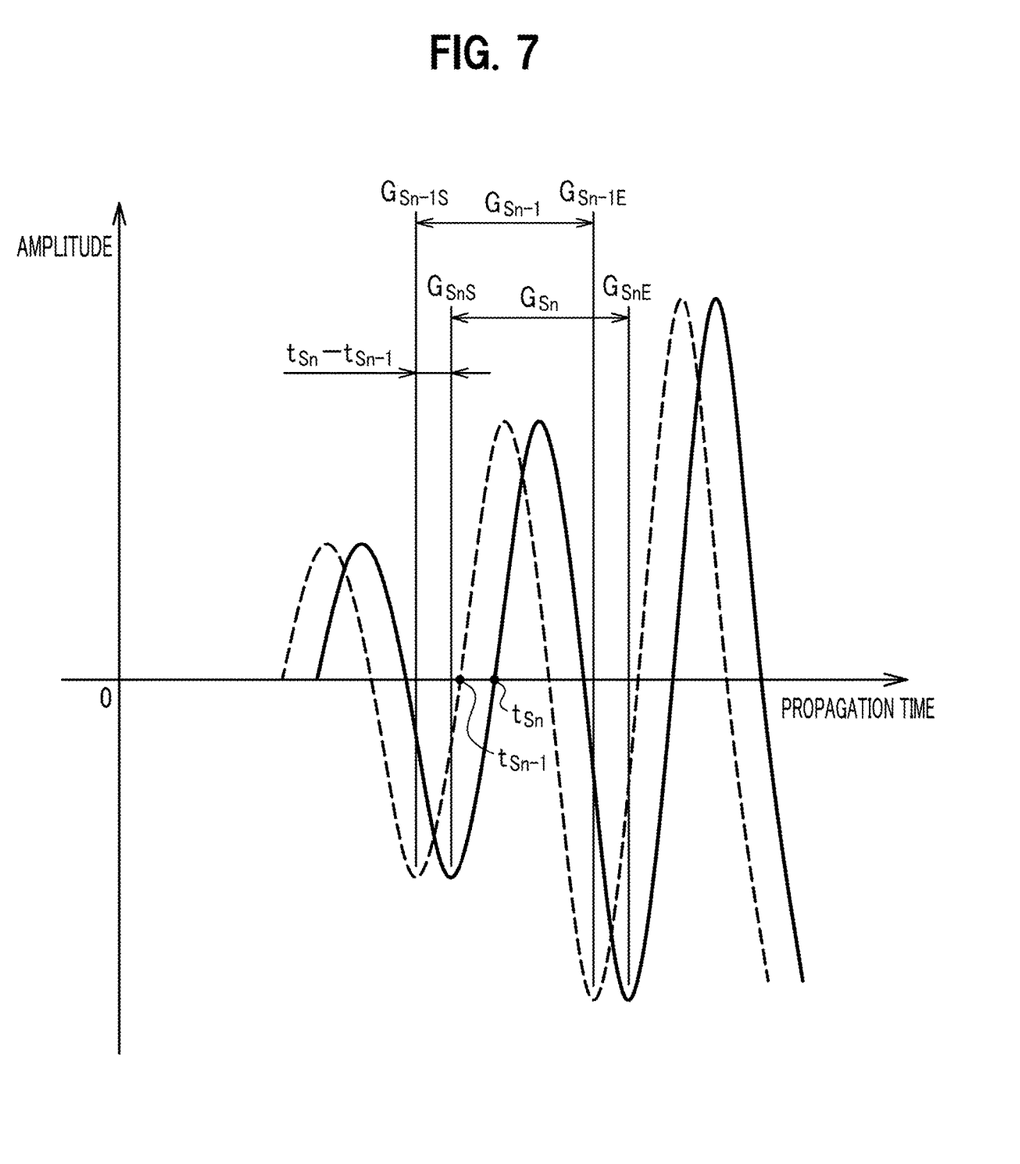
FIG. 7 is an explanatory diagram for explaining a gate auto-tracking process performed on a head echo in the bolt axial force measurement method according to the embodiment of the present invention.

To be specific, the echo detection section 31$d$ detects a zero-crossing point of the Sn echo signal just before the positive or negative peak of the Sn echo signal in the S echo gate $G_{Sn-1}$ and obtains the propagation time $t_{Sn}$ at the zero-crossing point as the propagation time of the Sn echo (see FIG. 7).

In a similar manner, the echo detection section 31$d$ detects a zero-crossing point of the Bn echo signal just before the positive or negative peak of the Bn echo signal in the B echo gate $G_{Bn-1}$ and obtains the propagation time $t_{Bn}$ at the zero-crossing point as the propagation time of the Bn echo (not illustrated).

The echo detection section 31$d$ repeats step S109 until finishing obtaining the propagation time of the Sn echo and the propagation time of the Bn echo (No in step S110).

When the echo detection section 31$d$ finishes obtaining the propagation times of the Sn echo and Bn echo (Yes in step S110), the axial force calculation section 31$b$ calculates (step S111) the axial force F of the bolt 1 on the basis of the propagation times $t_{Sn}$ and $t_{Bn}$ and initial propagation time T.

Incidentally, the probe 24 (see FIG. 2) supported in a semi-floating manner reduces disturbance in the waveforms of the Sn echo and Bn echo.

The length of the bolt 1 is obtained on the basis of the difference ($t_{Bn}-t_{Sn}$) between the propagation time at the zero-crossing point of the Sn echo signal and the propagation time at the zero-crossing point of the Bn echo signal.

The elongation ($\delta$) of the bolt 1 is calculated by the elongation calculation section 31$c$ on the basis of the difference between the propagation times calculated by the echo detection section 31$d$ (see FIG. 1).

The axial force calculation section 31$b$ obtains the elongation ($\delta$) of the bolt 1 calculated by the elongation calculation section 31$c$ and obtains the parameters of equation 1 by referencing the storage 32 (see FIG. 1). The axial force calculation section 31$b$ calculates (step S111) the axial force of the bolt 1 according to equation 1 and outputs the calculated axial force to the display section 34 (see FIG. 1).

Subsequently, the echo detection section 31$d$ performs (step S112) a tracking process for each of the S echo gate $G_{Sn}$ and the B echo gate $G_{Bn}$.

To be specific, the echo detection section 31$d$ shifts the starting point $G_{Sn-1S}$ of the S echo gate $G_{Sn-1}$ of the previous ((n−1)-th) PRP by a time period ($t_{Sn}-t_{Sn-1}$) to set a starting point $G_{SnS}$ of the S echo gate $G_{Sn}$ of the current (n-th) PRP (see FIG. 7).

The echo detection section 31$d$ sets an ending point $G_{SnE}$ of the S echo gate $G_{Sn}$ to one wave-cycle after the starting point $G_{SnS}$ (see FIG. 7).

While the axial force is being applied, the head 3 of the bolt 1 may be subject to distortion due to the applied axial force in some cases. The tracking process for the S echo gate $G_{Sn}$ is a process to address the distortion of the head 3 for suitable detection of the Sn echo.

In a similar manner, the echo detection section 31$d$ shifts the starting point $G_{Bn-1S}$ of the B echo gate $G_{Bn-1}$ of the previous ((n−1)-th) PRP by a time period ($t_{Bn}-t_{Bn-1}$) to set a starting point $G_{BnS}$ of the B echo gate $G_{Bn}$ of the current (n-th) PRP (not illustrated).

The echo detection section 31$d$ sets an ending point $G_{BnE}$ of the B echo gate $G_{Bn}$ to one wave-cycle after the starting point $G_{BnS}$.

While the axial force is being applied, the shank 2 of the bolt 1 is elongated due to the applied axial force. The tracking for the B echo gate $G_{Bn}$ is a process to address the elongation of the shank 2 for suitable detection of the Bn echo.

Subsequently, the axial force calculation section 31$b$ sets (step S113) a normal axial force range based on the calculated axial force (F).

Figure 8:
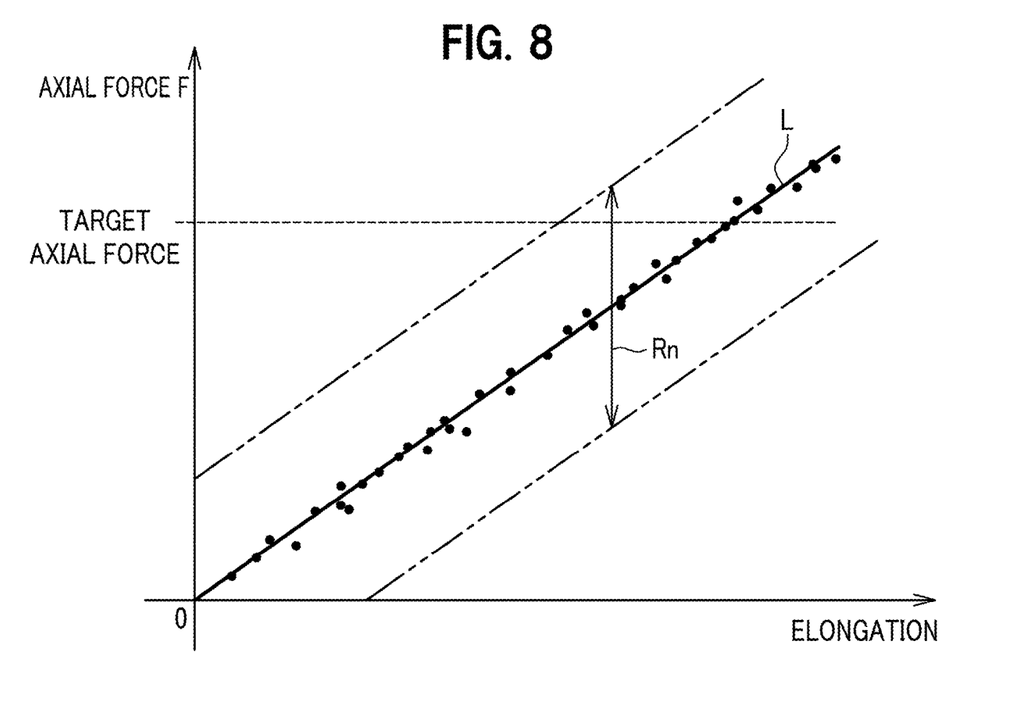
FIG. 8 is a graph example in which calculated bolt axial force is plotted in chronological order.

As illustrated in FIG. 8, to be specific, the axial force calculation section 31$b$ calculates a line L approximately representing change in axial force (F) over time, on the basis of the calculated axial force (F) plotted in chronological order.

The axial force calculation section 31b sets a normal axial force range Rn for the line L using a predetermined value (10% above and below the line L, for example).

Subsequently, when the axial force (F) remains outside the normal axial force range Rn for a previously-set amount of change in elongation (δ) or greater (Yes in step S114), the axial force calculation section 31b determines that the measurement is failing.

In this case, the nutrunner stop instruction section 31a outputs an instruction to stop the application of axial force, to the nutrunner 21 (see FIG. 1). Application of axial force to the bolt 1 is thereby stopped. As a result, the nutrunner 21 is stopped, and auto-tracking is stopped, which is not illustrated. This series of steps of the bolt axial force measurement process is thus terminated (abnormal termination).

When the axial force (F) does not remain outside the normal axial force range Rn for the previously-set amount of change in elongation (δ) or grater (No in step S114), the axial force calculation section 31b determines that the measurement is successful.

The nutrunner stop instruction section 31a obtains the axial force (F) of the bolt 1 calculated by the axial force calculation section 31b (see FIG. 1). The nutrunner stop instruction section 31a then determines whether the axial force (F) of the bolt 1 has reached a target axial force (step S115).

When the axial force (F) of the bolt 1 has not yet reached the target axial force (No in step S115), the nutrunner stop instruction section 31a (see FIG. 1) outputs an instruction to continue application of axial force, to the nutrunner 21 (see FIG. 1). That is, the flow returns to step S108, and the nutrunner 21 continues application of axial force to the bolt 1.

When the axial force (F) of the bolt 1 has reached the target axial force (Yes in step S115), the nutrunner stop instruction section 31a (see FIG. 1) outputs to the nutrunner 21 (see FIG. 1) an instruction to stop the application of axial force. Application of axial force to the bolt 1 is thereby stopped. As a result, the nutrunner 21 is stopped, and auto-tracking is stopped, which is not illustrated. This series of steps of the bolt axial force measurement process is thus terminated (normal termination).

The flow may be configured to determine abnormality based on the amount of change in elongation (δ) of the bolt 1 and the normal range thereof, instead of the axial force (F). To be specific, the flow may be configured to terminate the bolt axial force measurement process when the amount of change in elongation (δ) of the bolt 1 has reached a target value.

Echo Amplification Method

The ultrasound transmission and reception controller 31f of the embodiment includes a first amplitude correction section 31f1, a second amplitude correction section 31f2, and a third amplitude correction section 31f3.

The first amplitude correction section 31f1 corrects the amplitudes of the both echo in the head and bottom echo gates by the same amount according to an amplitude amplification which is set for the entire time axis.

Figure 9:
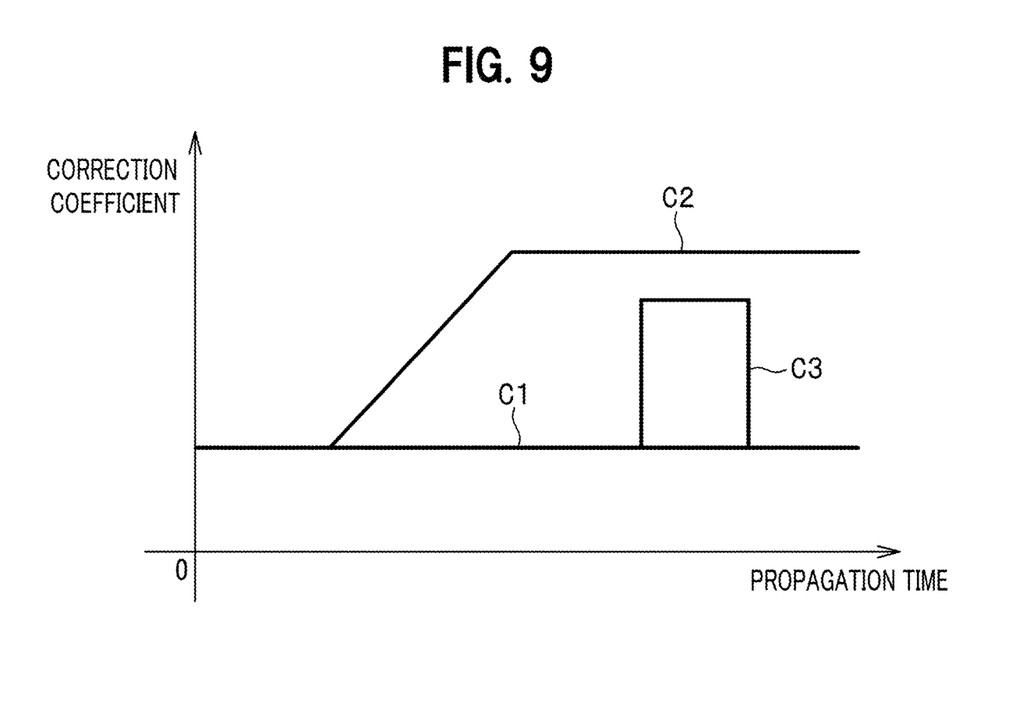
FIG. 9 is an explanatory diagram illustrating correction coefficients (amplification) for correcting amplitudes of head and bottom echoes.

In this embodiment, a correction coefficient C1 (see FIG. 9) for the amplitude amplification is set in advance according to the result of a pre-experiment or the like.

The second amplitude correction section 31f2 applies a correction to the echo signal in one of the head and bottom echo gates so that the amplitude of the echo signal in the other one is approximated to that of the echo signal in the one of the head and bottom echo gates.

In this embodiment, a correction coefficient C2 (see FIG. 9) for the amplitude amplification is to apply a correction to approximate the amplitude of the Bn echo signal to the amplitude of the Sn echo signal. The correction coefficient C2 is set in advance according to the result of a pre-experiment or the like. The second amplitude correction section 31f2 multiplies the amplitude of the Bn echo signal by the correction coefficient C2 specified for the propagation time period of the echo gate in which the Bn echo is to be detected. The second amplitude correction section 31f2 thereby allows the display section 34 to display the Sn echo signal and Bn echo signal with the amplitudes set substantially equal to each other in the respective echo gates.

The third amplitude correction section 31f3 applies a correction to the amplitude of the echo signal in one of the head and bottom echo gates. In this embodiment, a correction coefficient C3 of the amplitude amplification (see FIG. 9) is to apply a correction to approximate the amplitude of the Bn echo signal to the amplitude of the Sn echo signal. The correction coefficient C3 is set in advance according to the result of a pre-experiment or the like. The third amplitude correction section 31f3 thereby allows the display section 34 to display the Sn echo signal and Bn echo signal with the amplitudes set substantially equal to each other in the echo gates.

The bolt axial force measurement apparatus 10 may be configured to correct amplitudes with any one of the first to third amplitude correction sections 31f1, 31f2, and 31f3 alone or may be configured to correct the amplitude of the echo in each echo gate to substantially the same amplitude using both of the second and third amplitude correction sections 31f2 and 31f3.

In the case of using both of the second and third amplitude correction sections 31f2 and 31f3, the bolt axial force measurement apparatus 10 may be configured such that the second amplitude correction section 31f2 first corrects the amplitudes of both the Sn echo and Bn echo signals and the third amplitude correction section 31f3 then further corrects the amplitude of the Bn echo signal. Such a correction method approximates the amplitudes of the Sn echo and Bn echo in the respective echo gates to each other more accurately.

Bolt

The bolt 1 to be measured by the bolt axial force measurement method described above includes a shank 2 and the head 3 (see FIG. 3). The aforementioned bottom surface 2c of the bolt 1 is defined at the distal end portion of the shank 2 of the bolt 1.

Formed on an outer peripheral portion of the head portion 3 is an engaging portion 4 that is engageable with a tightening tool (for example, a torque wrench or the like) for the bolt 1.

As illustrated in FIG. 3, the recess 5 is formed in the head 3.

The recess 5 has the bottom surface 6 and a side wall 11 extending from a periphery of the bottom surface 6 generally upward The bottom surface 6 is formed such that it includes a plane whose normal is parallel with an axis the bolt 1.

The recess 5 includes the large-diameter portion 14a and the small-diameter portion 14b. The large-diameter portion 14a is formed on the opening side of the recess 5. The small-diameter portion 14b has a small-inner diameter than that of the large-diameter portion 14a and forms the side wall 11. The small-diameter portion 14b is joined to the large-diameter portion 14a with the step portion 14c interposed therebetween. The step portion 14c absorbs the difference in inner diameter.

The large diameter portion 14a, the step portion 14c, and the small diameter portion 14b form the recess 5 (stepped recess) in the head portion 3 of the bolt 1 so that the recess 5 has a step and is coaxial with the bolt axis.

The stepped recess 5 is configured such that the stepped protrusion 29, having the step portion 24b, of the probe 24 is interfitted with the stepped recess 5.

The side wall 11, which constitutes the small-diameter portion 14b, extends linearly from the bottom surface 6 side toward the opening side of the recess 5 in a side view of the bolt 1 illustrated in FIG. 3. However, the side wall 11 is not limited to such a wall that extends linearly so long as the side wall 11 is able to be interfitted with the probe 24. The side wall 11 may be partially bulged outward in the radial direction of the head 3.

Operation and Advantageous Effect

Next, the operation and advantageous effects of the embodiment will be described.

Operation and Advantageous Effect of Tightening Device

In a conventional tightening device, the socket and the ultrasonic sensor are integrally provided as a single unit. This could cause inclination, wobbling, and vibration of the socket to be transmitted to the probe when tightening a bolt. The conventional tightening device therefore cannot measure the bolt axial force with a sufficient degree of accuracy while tightening the bolt.

In contrast, according to the structure of the tightening device 20 of the embodiment, the socket 22 and probe 24 are provided separately and independently.

Figure 10A:
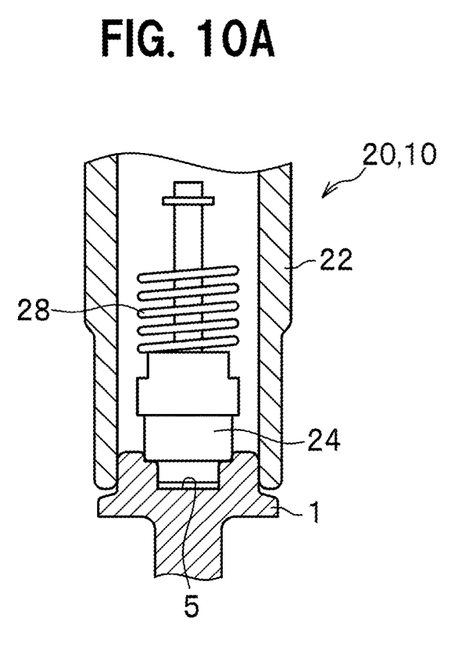
FIGS. 10A and 10B are explanatory diagrams for explaining operations of the tightening device included in the bolt axial force measurement apparatus.
Figure 10B:
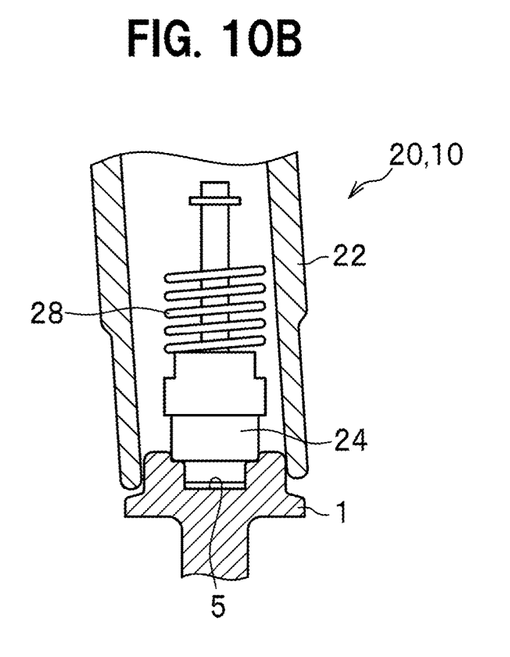

FIGS. 10A and 10B are diagrams of the tightening device 20 included in the bolt axial force measurement apparatus 10, illustrating operations of the tightening device 20 tightening the bolt 1.

As illustrated in FIG. 10A, in the tightening device 20 of the embodiment, the socket 22 and probe 24 are provided separately and independently.

To tighten the bolt 1 with the thus-configured tightening device 20, as described above, the probe 24 is interfitted with the recess 5 of the bolt 1, and the socket 22 is fitted on the bolt 1. The socket 22 is rotated to tighten the bolt 1, and the probe 24 detects elongation of the bolt 1.

As illustrated in FIG. 10B, according to the structure of the tightening device 20, even if the socket 22 wobbles during tightening of the bolt 1, the angle at which the probe 24 is pressed against the bolt 1 does not change since the probe 24 is provided independently of the socket 22. The tightening device 20 is therefore able to measure the elongation of the bolt 1 with a high degree of accuracy without being influenced by the wobbling of the socket 22.

The probe 24 is supported by the lower end of the rotary shaft 21a in a semi-floating manner via the resilient coil spring 28 as described above (see FIG. 2).

As illustrated in FIG. 10B, even if the socket 22 inclines with respect to the axis of the bolt 1, the probe 24 does not incline with respect to the axis of the bolt 1.

Thus, the tightening device 20 is able to measure the axial force with a high degree of accuracy.

The probe 24 of the tightening device 20 of the embodiment is interfitted with the recess 5. With this structure of the tightening device 20, the probe 24 is thereby firmly fixed to the recess 5. The tightening device 20 is therefore able to measure the axial force with a high degree of accuracy.

According to the structure of the tightening device 20 of the embodiment, the gap 41 is formed between the top surface of the bolt 1 defined by the bottom surface 6 of the recess 5 and the surface of the probe 24 defined by the top surface 24d of the protrusion 24a. This gap 41 is filled with the ultrasound propagation medium 42.

According to this structure of the tightening device 20, it is possible to prevent measurement errors due to change in waveform in the gap 41. The tightening device 20 is therefore able to measure the axial force with a high degree of accuracy.

Operation Effect of Bolt Axial Force Measurement Method

A general bolt to be measured by ultrasonic measurement device whose probe is placed in a recess formed in the head of the bolt varies in flatness of the bottom surface of the recess that defines the top surface of the bolt. For this reason, a configuration such that the probe is brought into close contact with the bottom surface of the recess yields an insufficient degree of accuracy in ultrasonic measurements.

In contrast, the bolt 1, which is used in the bolt axial force measurement method of the embodiment, includes the step portion 14c in the recess 5.

According to the thus-configured bolt axial force measurement method and the bolt 1 used therein, the probe 24 is supported by the step portion 14c to form the gap 41 between the probe 24 and the bottom surface 6 of the recess 5. According to the bolt axial force measurement method, therefore, it is possible to considerably improve the accuracy of ultrasonic measurements.

According to the bolt axial force measurement method, the gap 41 is filled with the ultrasound propagation medium 42.

According to the bolt axial force measurement method, the attenuation of ultrasound in the gap 41 is reduced. According to the bolt axial force measurement method of the embodiment, it is possible to measure the axial force with a higher degree of accuracy.

In general, when the probe 24 is brought into contact with the top surface of the bolt 1 (bottom surface 6 of the recess 5) for B-echo measurement, the origin of emission of ultrasound (0 position) cannot be measured due to the self-vibration of the probe 24 when the probe 24 emits ultrasound. For this reason, in the conventional volt axial force measurement method, B1 echo (first bottom echo) cannot be used for axial force measurement, and the axial force measurement is performed using B2 echo and subsequent B echoes (second bottom echo and subsequent bottom echoes) in which the self-vibration has settled. However, the B2 echo and subsequent B echoes are attenuated and smaller than the B1 echo and are significantly influenced by noises.

In contrast, according to the bolt axial force measurement method of the embodiment, provision of the gap 41 allows for measurement of bolt axial force on the basis of the difference between S1 echo from the top surface of the bolt 1 and B1 echo. With the bolt axial force measurement method of the embodiment, therefore, use of B1 echo, which is attenuated less than the B2 echo and includes less noise, further improves the degree of accuracy in bolt axial force measurement.

Operation and Advantageous Effect of Bolt Axial Force Measurement Apparatus

The bolt axial force measurement apparatus 10 of the embodiment includes: the echo detection section 31d that detects a head echo (Sn echo) and a bottom echo (Bn echo) of an ultrasonic pulse emitted from the head side of the bolt 1 toward the bottom surface of the shank of the bolt 1; and the axial force calculation section 31b that calculates the axial force of the bolt 1 based on the time difference between predetermined portions of the head echo and bottom echo detected by the echo detection section 31d.

The echo detection section 31d sets the head echo gate $G_{Sn}$ for the head echo and sets the bottom echo gate $G_{Bn}$ for the bottom echo. The arithmetic processing unit 31 performs tracking processes for plural ultrasonic pulses emitted during the tightening of the bolt 1 so that the head echo gate $G_{Sn}$ and bottom echo gate $G_{Bn}$ are shifted independently so as to include predetermined portions of the head echo and bottom echo respectively at the same positions in the head echo gate $G_{Sn}$ and bottom echo gate $G_{Bn}$.

The bolt axial force measurement apparatus 10 of the embodiment independently performs the tracking processes for the head echo and bottom echo without setting a reference gate, thus measuring the axial force (F) of the bolt 1 more reliably with a higher degree of accuracy.

The bolt axial force measurement apparatus 10 of the embodiment includes the amplitude correction section (ultrasound transmission and reception controller 31f) which applies corrections to the echo signals so that the amplitude of the head echo (Sn echo) signal in the head echo gate $G_{Sn}$ is approximated to the amplitude of the bottom echo (Bn echo) signal in the bottom echo gate $G_{Bn}$.

The bolt axial force measurement apparatus 10 of the embodiment is therefore able to display the head echo (Sn echo) signal and bottom echo (Bn echo) signal with the amplitude heights set substantially equal to each other, irrespective of attenuation of the bottom echo (B echo).

The amplitude correction section of the bolt axial force measurement apparatus 10 of the embodiment includes at least one of the first amplitude correction section 31f1, which sets the amplitude amplification for the entire time axis and corrects the amplitudes of the echo signals in the head echo gate $G_{Sn}$ and bottom echo gate $G_{Bn}$ according to an amplification; and the second amplitude correction section 31f2, which takes a first echo signal in one of the head echo gate $G_{Sn}$ and bottom echo gate $G_{Bn}$ as a reference and applies correction to a second echo signal of the other one of the head echo gate $G_{Sn}$ and bottom echo gate $G_{Bn}$ on the basis of the reference so that the amplitude of the second echo signal is approximated to the amplitude of the first echo signal.

The bolt axial force measurement apparatus 10 of the embodiment is therefore able to display the head echo (Sn echo) signal and bottom echo (Bn echo) signal with the amplitude heights set substantially equal to each other.

The echo detection section 31d of the bolt axial force measurement apparatus 10 of the embodiment sets the head echo gate to one wave-cycle of the ultrasonic pulse about a positive or negative peak of the head echo signal that has first arrived after the amplitude of the signal has exceeded the first predetermined value $L_S$, and sets the bottom echo gate to one wave-cycle of ultrasonic pulse about a positive or negative peak of a bottom echo signal that has first arrived after the amplitude of the signal has exceeded the second predetermined value $L_B$.

For each of the head and bottom echo gates, the echo detection section 31d translates the echo signal in such a way that a zero amplitude point of the echo signal before the positive or negative peak is translated to a predetermined position.

With this processing of the bolt axial force measurement apparatus 10 of the embodiment, by setting the range of each echo gate narrower and setting the range elongated after the predetermined position, it is possible to suitably track the shifting of each echo due to the elongation of the bolt and the like.

The embodiment of the present invention has been described hereinabove. The present invention is not limited to the above-described embodiment and can be carried out in various modes.

The description of the embodiment describes the tightening device 20, which tightens the head 3 of the bolt 1 with the socket 22, as an example. The tightening device 20 of the present invention may be configured to tighten a nut (not illustrated) mated with the bolt 1. In addition, the present invention can be embodied as a bolt axial force measurement program causing a computer to function as the bolt axial force measurement apparatus 10.

What is claimed is:

1. A tightening device, comprising:
a sensor for detecting an elongation of a bolt;
a socket for rotating the bolt; and
a biasing member for biasing the sensor against a head of the bolt, wherein
the sensor and the socket are provided separately and independently of each other,
the bolt has a head with a recess formed therein, the recess having an opening and a bottom surface,
the recess includes a large-diameter portion and a small-diameter portion, the large-diameter portion formed on an opening side of the recess, the small-diameter portion formed on a bottom surface side of the large-diameter portion with a step portion between the small-diameter portion and the large-diameter portion, the small-diameter portion having an inner diameter smaller than an inner diameter of the large-diameter portion, and
the sensor includes a body and a protrusion protruding from the body, the body configured to be fitted into the large-diameter portion and come into abutment with the step portion, the protrusion configured to be inserted into the small-diameter portion.

2. A tightening device comprising:
a sensor for detecting an elongation of a bolt;
a socket for rotating the bolt; and
a biasing member for biasing the sensor against a head of the bolt, wherein
the sensor and the socket are provided separately and independently of each other,
the socket is attached to a rotary shaft,
the sensor is provided within the socket and is supported by the rotary shaft in a semi-floating manner via the biasing member,
the bolt has a head with a recess formed therein, the recess having an opening and a bottom surface,
the recess includes a large-diameter portion and a small-diameter portion, the large-diameter portion formed on an opening side of the recess, the small-diameter portion formed on a bottom surface side of the large-diameter portion with a step portion between the small-diameter portion and the large-diameter portion, the small-diameter portion having an inner diameter smaller than an inner diameter of the large-diameter portion, and
the sensor includes a body and a protrusion protruding from the body, the body configured to be fitted into the large-diameter portion and come into abutment with the step portion, the protrusion configured to be inserted into the small-diameter portion.

3. The tightening device according to claim 1, wherein
the sensor is an ultrasonic sensor, and
when the sensor is placed within the recess, the protrusion forms a gap to be filled with an ultrasound propagation medium, between the protrusion and the bottom surface.

4. The tightening device according to claim 2, wherein
the sensor is an ultrasonic sensor, and
when the sensor is placed within the recess, the protrusion forms a gap to be filled with an ultrasound propagation medium, between the protrusion and the bottom surface.

5. The tightening device according to claim 1, wherein the biasing member is a resilient member.

6. The tightening device according to claim 2, wherein the biasing member is a resilient member.

7. The tightening device according to claim 3, wherein the biasing member is a resilient member.

8. The tightening device according to claim 4, wherein the biasing member is a resilient member.

* * * * *